United States Patent
Chemali (10) Patent No.: US 10,023,017 B1
(45) Date of Patent: *Jul. 17, 2018

(54) AIR-DRAG POWERED DEVICES FOR VEHICLE WHEELS

(71) Applicant: Pygmalion Technologies, LLC, Humble, TX (US)

(72) Inventor: Roland E. Chemali, Humble, TX (US)

(73) Assignee: Pygmalion Technologies LLC, Humble, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/408,881

(22) Filed: Jan. 18, 2017

(51) Int. Cl.
  *B60C 23/12* (2006.01)

(52) U.S. Cl.
  CPC .................... *B60C 23/12* (2013.01)

(58) Field of Classification Search
  CPC ............................... B60C 23/12; F04B 35/06
  USPC ................. 152/418, 419, 427, 429; 417/233
  See application file for complete search history.

(56) References Cited

U.S. PATENT DOCUMENTS

| | | | | |
|---|---|---|---|---|
| 1,092,068 A | * | 3/1914 | McDonald et al. | .... B60C 23/12 152/423 |
| 1,330,072 A | * | 2/1920 | Geddes | ................... B60C 23/12 152/418 |
| 1,643,945 A | * | 10/1927 | Crook | ..................... B60C 23/12 152/418 |
| 1,679,505 A | * | 8/1928 | McDonald et al. | .... B60C 23/10 152/418 |
| 1,875,874 A | * | 9/1932 | Johnson | ............... B60C 23/0496 152/418 |
| 1,930,041 A | * | 10/1933 | Crowley | .................. B60C 23/12 152/418 |
| 5,409,049 A | * | 4/1995 | Renier | .................... B60C 23/12 152/418 |
| 5,556,489 A | * | 9/1996 | Curlett | .................... B60C 23/12 152/418 |
| 5,947,696 A | * | 9/1999 | Baumgarten | ........... B60C 23/12 152/418 |

(Continued)

FOREIGN PATENT DOCUMENTS

| | | |
|---|---|---|
| CN | 205044451 | 2/2016 |
| EP | 1609630 | 12/2005 |
| EP | 2851214 | 3/2015 |

(Continued)

*Primary Examiner* — Kip T Kotter
(74) *Attorney, Agent, or Firm* — Ramey & Schwaller, LLP (57) ABSTRACT

Air-drag powered devices are provided for automatically maintaining a target inflation pressure or for equipping vehicle wheels with additional functionality. One illustrative device embodiment is an air compressor that attaches to the wheel of a vehicle to turn with the wheel as the vehicle moves. A drag member extends from the body of the air compressor to alternately present opposing surfaces to the air through which the vehicle passes. The air drag on the member thus creates an alternating drag force that powers the air compressor. Another illustrative device embodiment is an energy harvester that attaches to the wheel of a vehicle to turn with the wheel as the vehicle moves. A drag member attached to the base of the energy harvester presents alternating surfaces to the air through which the vehicle passes to derive a reciprocating motion suitable for generating electricity usable for powering wheel-mounted sensors or lights.

19 Claims, 5 Drawing Sheets

(56) References Cited

U.S. PATENT DOCUMENTS

| | | | | |
|---|---|---|---|---|
| 7,322,392 B2 * | 1/2008 | Hawes | ............... | B60C 23/12 |
| | | | | 152/418 |
| 2004/0025996 A1 * | 2/2004 | Akahori | ............ | B60C 23/12 |
| | | | | 152/419 |

FOREIGN PATENT DOCUMENTS

| | | | | |
|---|---|---|---|---|
| JP | 2011000940 | | 1/2011 | |
| JP | WO 2014181504 A1 * | 11/2014 | ......... | B60C 23/12 |

* cited by examiner

AIR-DRAG POWERED DEVICES FOR VEHICLE WHEELS

BACKGROUND

By some recent estimates there are over 1 billion passenger vehicles in the world, with over a quarter of that number in the United States alone. The tires on the wheels of these vehicles are, for a variety of reasons, chronically underinflated. This underinflated condition increases carbon emissions while reducing fuel economy, tire life, and braking and steering performance, yet often goes uncorrected for extended periods of time due to the required effort and low priority associated with re-inflating the tires to proper levels.

Various efforts have been made to address this issue. Among the less successful efforts are various tire and wheel designs incorporating automatic inflation systems. It appears that these efforts have been unsuccessful for a number of reasons including: the cost of such systems, design flaws, and requirements for substantial modifications to the existing tire and wheel designs. It is believed that these issues are obstacles to retrofitting existing vehicle wheels, dooming most of these efforts to failure.

The most successful of these efforts is the incorporation of wireless pressure sensors in tire valve stems to detect underinflated conditions and to alert the driver of the need for such prompt action. Yet even this effort has met with limited success as drivers often postpone such action until it is convenient.

SUMMARY

Accordingly, there are disclosed herein air-drag powered devices for automatically maintaining a target inflation pressure or for equipping vehicle wheels with additional functionality. One illustrative device embodiment is an air compressor that attaches to the wheel of a vehicle to turn with the wheel as the vehicle moves. A drag member extends from the body of the air compressor to alternately present opposing surfaces to the air through which the vehicle passes. The air drag on the member thus creates an alternating drag force that powers the air compressor.

Another illustrative device embodiment is an energy harvester that attaches to the wheel of a vehicle to turn with the wheel as the vehicle moves. A drag member attached to the base of the energy harvester presents alternating surfaces to the air through which the vehicle passes to derive a reciprocating motion.

An illustrative vehicle embodiment includes one or more wheels, each wheel having an inflatable tire with a valve stem and an air-drag powered compressor attached to the valve stem. The air-drag powered compressor operates, in response to motion of the vehicle through air, to maintain inflation of the tire near a target level.

An illustrative embodiment of a method for maintaining a target inflation level in vehicle tires includes: causing wheels supporting the vehicle to rotate, thereby conveying the vehicle along a road; and on each wheel: (a) exposing alternating sides of a drag member on the wheel to air through which the vehicle moves, thereby receiving an alternating drag force that reciprocates the drag member relative to the wheel; (b) deriving compressed air from reciprocation of the drag member; and (c) supplying the compressed air to an inflatable tire on the wheel when an inflation level of the tire falls below the target inflation level by more than a threshold value.

Each of the foregoing embodiments may be employed separately or in combination, and may have one or more of the following features in any suitable combination: (1) an air outlet that couples to an inlet valve of an inflatable tire mounted to the wheel. (2) the inlet valve is a Schrader valve, preferably with a calibrated (low) opening pressure. (3) the air outlet optionally includes a prong to keep the Schrader valve open. (4) a pressure limiting valve to prevent overfilling of the inflatable tire. (5) the compressor body attaches to the wheel solely via the coupling between the air outlet and the inlet valve. (6) a valve stem extender that couples the air outlet to the inlet valve. (7) a bracket that secures the compressor body to a wheel lug. (8) a piston driven by reciprocating motion of the drag member. (9) valves that cause the at least one piston to draw air into a cylinder and expel compressed air from the cylinder. (10) a ratchet mechanism to aggregate reciprocations of the drag member into a combined operation on the piston. (11) a diaphragm or bellows driven by reciprocating motion of the drag member to compress and expel air via the air outlet. (12) the alternating drag force is asymmetric. (13) a spring to reduce the asymmetry, preferably to an optimal level for the pump cycle. (14) the drag member comprises a vane that extends no more than 2.5 cm from the body or base. (15) the body or base provides an open housing for the vane to protect against damage while enabling air flow to reach the vane. (16) the reciprocating motion drives a positive displacement or rotary mechanism to provide compressed air. (17) a valve arrangement that supplies the compressed air to the tire when the tire has an inflation level below the target level by more than a given threshold. (18) the valve arrangement bleeds air from the tire when the tire has an inflation level above the target level. (19) the positive displacement mechanism is a piston that is directly actuated by reciprocation of the drag member. (20) inhibiting reciprocation of the drag member when the inflation level exceeds the target inflation level. (21) removing a dust cap from a valve stem on each wheel. (22) securing an air drag powered air compressor to the valve stem in place of each dust cap. (23) a generator driven by the reciprocating motion to generate electrical power. (24) at least one sensor powered by the electrical power, such as a pressure sensor. (25) at least one light source powered by the electrical power. (26) an air compressor powered by the electrical power.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

Figure 1:
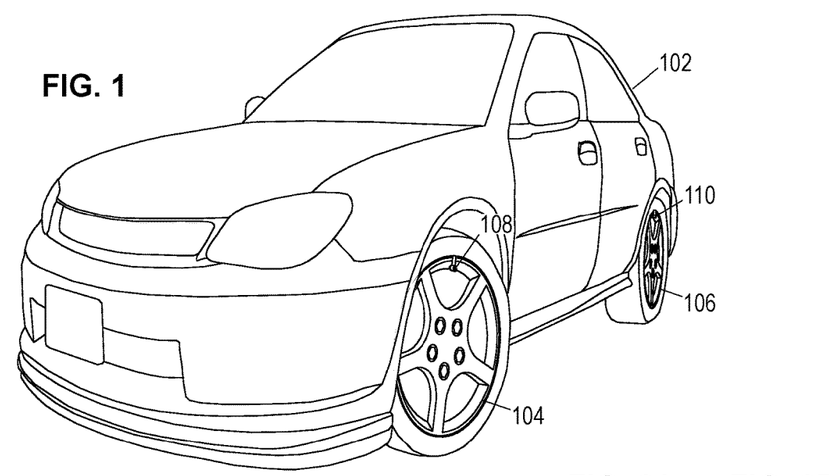
FIG. 1 is a perspective view of an illustrative wheeled vehicle.

FIG. 1 shows an illustrative passenger vehicle 102 having wheels 104, 106 which have been retrofitted with drag-powered air compressors 108, 110. The illustrated vehicle is a sedan, but the following disclosure is applicable to all vehicles having inflatable tires including trucks, buses, vans, cars, carts, motorcycles, bicycles, trailers, dollies, and off-road transportation.

Figures 2A, 2B:
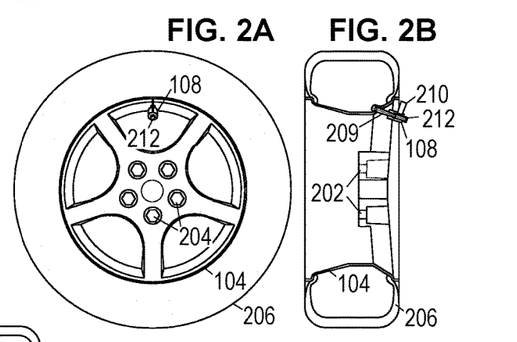
FIGS. 2A and 2B are a front and side section view of a wheel with a drag-powered device mounted on the valve stem.

FIGS. 2A and 2B show wheel 104 with an illustrative drag-powered air compressor 108. Wheel 104 includes holes 202 for receiving wheel lugs (not shown). Lug nuts 204 thread onto the wheel lugs to secure the wheel 104 to the vehicle 102. Mounted to wheel 104 is an inflatable tire 206 which can be inflated or deflated via a valve stem 209. The valve stem 209 includes an integrated valve, which for automobile tires is conventionally a Schrader valve. By contrast, bicycle tires often employ Presta or Dunlop valves, which would also be compatible with at least some of the embodiments disclosed herein. In any event, the valve stem 209 may be equipped with an external screw thread to retain a dust cap for protecting the valve from debris.

Notably, Schrader valves include an internal pin that when depressed opens the valve to permit the passage of air. Inflation connectors for Schrader valves generally, though not necessarily, include a center prong to depress the valve's internal pin during inflation. Schrader valves with calibrated opening pressures are commercially available and can be opened by simply applying a specified overpressure (e.g., 20 or 30 psi above the tire's internal air pressure) to the valve inlet.

The illustrative drag-powered air compressor 108 mounts on the valve stem 209 in place of the dust cap. The compressor 108 may be screwed onto the valve stem's external thread and/or clamped in place. Any other suitable mounting mechanism can alternatively be employed. For Schrader valves, the air outlet of the compressor 108 preferably includes a center prong to depress the valve's internal pin, but alternative implementations employ air pressure alone to open the valve. Embodiments including the center prong to keep the Schrader valve open may include precautions against parasitic air leakage so as to avoid slowly deflating the tires to which they are attached. Such precautions may include equipping the compressor's air outlet with a rubber gasket or O-ring seal to assure a robust seal against the valve stem, and a reliable backup check valve that seals tightly when the tire pressure exceeds the outlet pressure. Moreover, rather than being coupled to the outlet connector, the center prong may be coupled to a portion of the body that is automatically removed or withdrawn in the event of damage to the compressor.

The compressor's mass is preferably minimized to avoid undue unbalancing of the wheel, with a value below 25 grams being considered desirable and attainable. Some contemplated compressor embodiments include a sleeve or open protective housing that encloses and reinforces the valve stem to protect the valve stem against fatigue and to stabilize the compressor body relative to the wheel. Alternatively, or in addition, buttress fins may stabilize the compressor body against the wheel. Preferably, however, the compressor mass and drag forces are kept to values that would not necessitate such reinforcement or stabilization.

The illustrative compressor 108 includes a drag member 210 that extends from the compressor body. The illustrated drag member 210 is a small rectangular vane approximately one centimeter wide and two centimeters long. The vane lies substantially within a plane extending axially and radially from the center of the wheel to efficiently intercept, near the top and bottom of the vane's orbit, a horizontal air flow from the vehicle's motion. As the compressor 108 rotates with the wheel, the drag member 210 alternately exposes its opposite sides to the air through which the vehicle moves.

Air impacting and moving around the vane (or other drag member) creates a drag force. As the drag member exposes its opposite sides to the flow, the drag force is exerted in opposing directions. The drag member is flexibly attached to the compressor body so that the alternating drag force causes the drag member to reciprocate relative to the compressor body. The compressor 108 uses the reciprocating motion of the drag member 210 to drive a positive displacement or rotary compression mechanism, thereby producing compressed air which may be used to inflate and maintain the tire at a desired inflation level.

To minimize the risk of damage, the vane may be formed from a resilient material such as plastic or metal and designed to accommodate significant bending without breaking. Additional protection for the vane may be provided in the form of an open protective housing that protects the vane from impacts by stationary objects or large debris, yet enables the passing air flow to impact the vane.

The illustrated air compressor 108 further includes a bypass inlet 212. With the bypass inlet, air can be supplied to the tire without first removing the compressor 108. In embodiments lacking the bypass inlet, manual inflation can be performed by first removing the compressor to expose the valve stem 209, which is then used in the conventional fashion. Afterwards, the compressor may be re-attached to the valve stem to maintain the new inflation level.

Figures 3A, 3B:
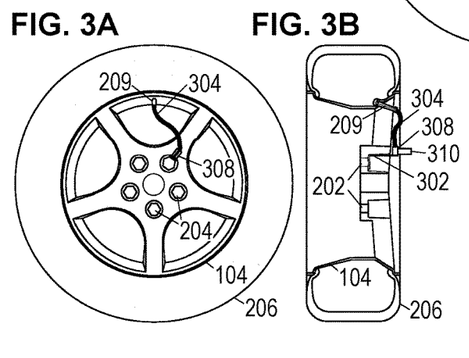
FIGS. 3A and 3B are a front and side section view of a wheel with a drag-powered device mounted on a lug.

FIGS. 3A and 3B show wheel 104 with an alternative embodiment of drag-powered air compressor 308. Compressor 308 is attached to a bracket 302 which is secured to the wheel by a lug nut 204. A valve stem extender 304 couples the valve stem 209 to the air outlet of the air compressor 308. The illustrated compressor 308 lacks a bypass inlet, as the valve stem extender 304 may be readily removed and re-secured at will. The compressor 308 includes a drag member 310, again shown as a small rectangular vane oriented substantially in a plane extending axially and radially from the center of the wheel. Vane 310 is hinged along a radial edge, whereas vane 210 was hinged along an substantially axial edge. Any drag member orientation that presents a significant cross-section in a plane extending axially and radially from the center of the wheel will experience the alternating drag force referenced previously. A wide variety of hinging, pivoting, translating, twisting, and/or flexing configurations are available to convert the alternating drag force into reciprocating motion of the drag member relative to the compressor body.

Figure 4:
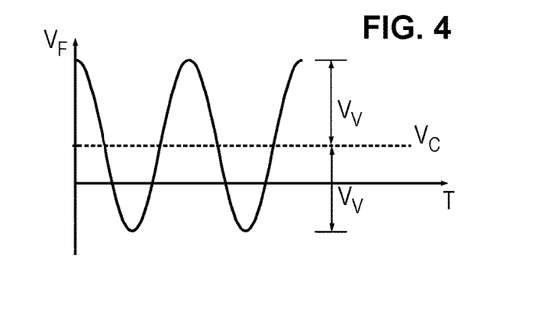
FIG. 4 is a graph of relative air speed versus time.

FIG. 4 shows the velocity of passing air on the face of a drag member $V_F$, where the speed of the vehicle is $V_V$ and the speed of the compressor's rotation relative to the wheel's center is $V_C$. (The vane is presumed to be collocated with the compressor body for this analysis, but this is not a requirement.) Assuming that the air itself is substantially stationary as the vehicle moves through it, the relative air speed is equal to the compressor's velocity, whose components are:

$$v_x = (R\omega) + r\omega \cos \omega t \quad (1)$$

$$v_y = -r\omega \sin \omega t \quad (2)$$

where R is the outer radius of the tire, ω is the angular velocity of the wheel (ratio of the vehicle's speed $V_v$ to R), r is the radial distance of the drag member from the center of the wheel, and t is time. If the drag member is a flat vane turning as the tire rotates, the face of the vane is exposed to these velocity components in a varying fashion, yielding a relative velocity against the face:

$$v_f = v_x \cos \omega t - v_y \sin \omega t \quad (3)$$

$$v_f = R\omega \left( \frac{r}{R} + \cos \omega t \right) = V_C + V_v \cos \omega t \quad (4)$$

where $V_C = r\omega$ is the orbital velocity of the compressor.

Thus, as shown in FIG. 4, the vane face moves through the air with the relative velocity having an average value $V_C$ determined by the ratio of the compressor's radial distance from the center to the outer radius of the wheel. This ratio can theoretically vary from zero (compressor positioned at the wheel's hub) to one (compressor positioned at the outer rim of the tire), causing the average value to vary from zero to the vehicle's speed $V_V$. Around this average value, the relative air velocity varies sinusoidally, with an amplitude equal to the vehicle's speed $V_V$.

Note that in all but the most extreme case (compressor positioned at the outer rim of the tire), the relative velocity alternates between positive and negative values, indicating that the air alternately strikes the front (positive) face of the vane and the back (negative) face of the vane. The alternation occurs with the same frequency as the rotation of the tire. The frequency is the vehicle speed divided by the tire circumference. At 22.3 m/s (50 mph), standard automobile tires rotate at approximately 9 to 15 hertz, providing roughly 400 to 700 rotations per kilometer (or 700-1100 per mile).

Given the relative air velocity, it becomes possible to determine the drag force in accordance with the equation:

$$F_D = \frac{1}{2} \rho C_D A v_f^2 \quad (5)$$

where ρ is the mass density of air, A is the impinged cross section of the drag member, and $C_D$ is the drag coefficient. The drag coefficient of a vane perpendicular to the flow is approximately 1.28. For the moment, we take the size of the vane as 1×2 cm, for a reference area of 2 cm². Air has an approximate density of 1.225 kg/m³. With these values, the drag force becomes:

$$F_D = v_f^2 (1.57 \times 10^{-4}) N \quad (6)$$

when velocity is in m/s. For a vane located at the center of the wheel on a vehicle moving 22.3 m/s, the positive and negative peaks of the drag force are approximately 0.08 N (0.28 ounces). For a vane located 60% of the way toward the outer rim of the tire, the positive drag force peak is 0.2N (0.72 ounces) and the negative peak is 0.01 N (0.045 ounces).

For comparison, a piston with a diameter of 1.5 mm (1/16 inch) would require 0.4 N to compress air 0.2 MP (32 psi) above atmospheric pressure. (To overpressure a Schrader valve with a calibrated opening pressure, the required force could be as much as double this value.) A lever, gear, or other form of mechanical advantage can readily amplify the force received by the drag member by a factor of 2-10, or even more if compound mechanisms are employed.

If the piston operates with a stroke length of about 1.5 mm, each stroke can provide about $7 \times 10^{-4}$ cm³ of compressed air. Each mile traveled can therefore provide over 0.5 cm³, which over the course of a typical year is adequate to replace over 10% of the air volume in most automobile tires. Stroke lengths up to about a centimeter are feasible and would yield commensurately larger volumes.

Figure 5A:
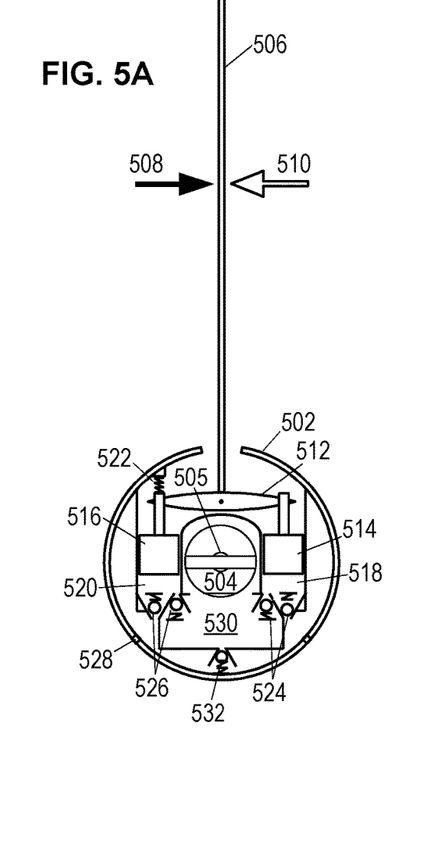
FIGS. 5A, 5B, and 5C are schematic diagrams of an illustrative drag-powered air compressor.

FIG. 5A shows an illustrative drag-powered air compressor having a compressor body 502 having an air outlet 504 that attaches to the valve stem of an inflatable tire on a wheel, causing the body 502 to turn with the wheel as the vehicle moves. An optional center prong 505 is included to depress the central pin of a Schrader valve in the tire stem. A drag member 506 extends from the compressor body 502 to alternately present opposing surfaces to air through which the vehicle moves. A front side of drag member 506 may receive a drag force 508 when the compressor body 502 is near the top end of its motion, and a back side may receive a drag force 510 when the body 502 is near the bottom of its motion.

FIG. 5A is not drawn strictly to scale, as the diameter of the body 502 is contemplated to be about 1 cm and the length of the drag member is contemplated to be 2-3 cm. Of course other dimensions would also be suitable and are also contemplated. The drag member 506 connects to a rocker arm 512 that pivots to drive the rods of two pistons 514, 516 with a mechanical advantage factor of four or more, reciprocating them within their respective cylinders 518, 520. An optional spring 522 may be provided to balance the asymmetry of the drag forces 508, 510. The ideal force exerted by such a spring would be half of the difference between the drag forces as adjusted by the mechanical advantage factor, but would never need to exceed the force needed to drive the piston 516 in the absence of any drag forces. The spring may need to be positioned on the other piston rod for compressors used on the opposite side of the vehicle, or the vane could be directed radially inward on the wheel rather than radially outward.

Figure 5B:
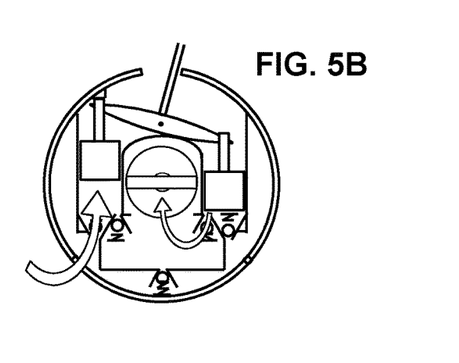
Figure 5C:
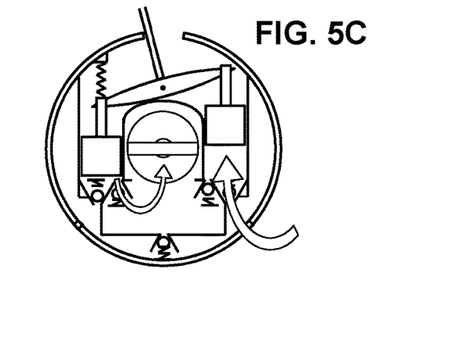

In at least some contemplated embodiments, the walls of cylinders 518, 520 are borosilicate glass and the pistons 514, 516 are graphite, providing for, self-lubricating, seal-less, low-friction operation with tight tolerances. Each cylinder includes a valve assembly 524, 526, that causes the pistons' reciprocating motion to draw air from the environment (via perforations 528) into the cylinders, pressurize, and expel the air into a collection chamber 530, from whence it exits via air outlet 504 to enter the tire as illustrated in FIGS. 5B and 5C. The use of two pistons doubles the volume of air injected on each cycle. A pressure limiting valve 532 connects to the collection chamber to release air when the air pressure exceeds a predetermined threshold value.

The illustrated valves 524, 526, 532, are ball-and-seat check valves. Other valve designs are also contemplated including poppet valves and swing check valves (also termed flapper valves or clapper valves). Moreover, the pistons may be replaced by bellows, diaphragms, or other such positive displacement devices that convert reciprocating motion into compressed air.

Figure 6A:
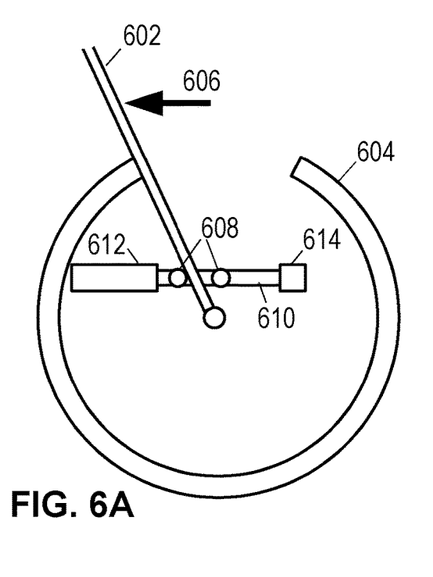
FIGS. 6A and 6B are schematic diagrams of another illustrative drag-powered air compressor.
Figure 6B:
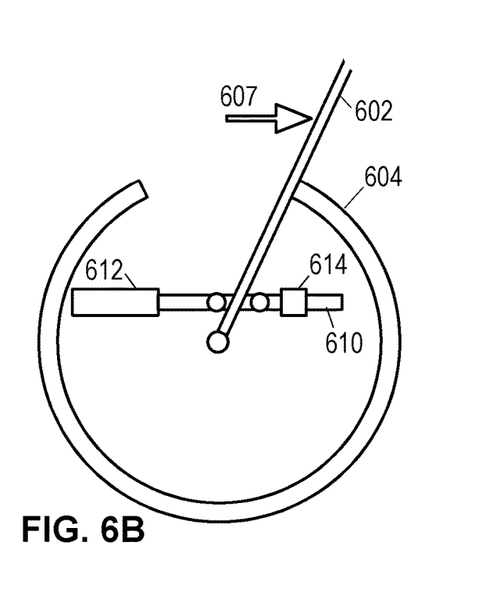

Alternative air compressor embodiments are shown in FIGS. 6A-6B, 7A-7B, and 8A-8B to demonstrate the variety of configurations that may be employed for deriving compressed air from reciprocating motion of the drag member. In the embodiment of FIGS. 6A-6B, the drag member 602 pivots with respect to the compressor body 604, which turns with the wheel to present alternating surfaces to the air through which the vehicle is moving, thereby receiving alternating drag forces 606, 607 that cause the drag member to reciprocate. In FIG. 6A, the front surface receives drag force 606, forcing the drag member 602 to the left. The drag member 602 is trapped between pins 608 on sliding rod 610, which connects to a piston inside cylinder 612. A guide 614 keeps the sliding rod 610 aligned with the cylinder 612. Due to the trapping pins 608, the sliding rod 610 forces the piston into the cylinder 612 when the drag member moves left. Conversely, when the drag member moves right due to drag force 607 on the back surface, the trapping pins force the sliding rod 610 to withdraw relative to the cylinder 612. The alternating drag forces 606, 607, thus cause the piston to reciprocate inside cylinder 612. A valve arrangement (not shown) causes the reciprocating piston to draw in air, pressurize the air, and expel the pressurized air via an air outlet.

The trapping pins 608 are positioned near the pivot point, magnifying the drag forces 606, 607 exerted further out on the drag member. A mechanical advantage factor of 10 or more may be readily achieved in this fashion. Note further that the front drag force 606 is employed to compress the air, and the back drag force 607 is employed merely to draw in fresh air, making the orientation of the drag member an important consideration. The compressors for the left and right sides of the vehicle would need to be configured accordingly, or the drag members directed inward on one side and outward on the other.

Figure 7A:
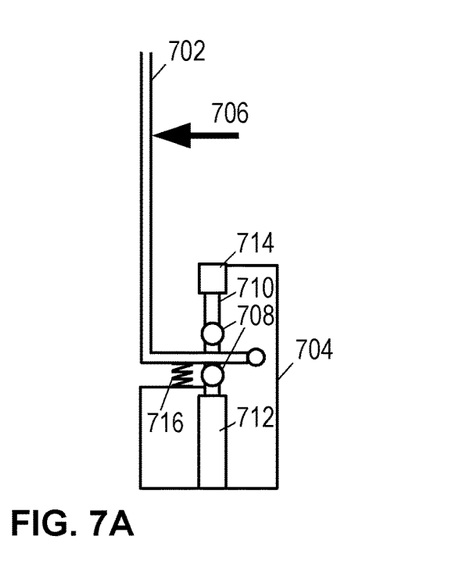
FIGS. 7A and 7B are schematic diagrams of yet another illustrative drag-powered air compressor.
Figure 7B:
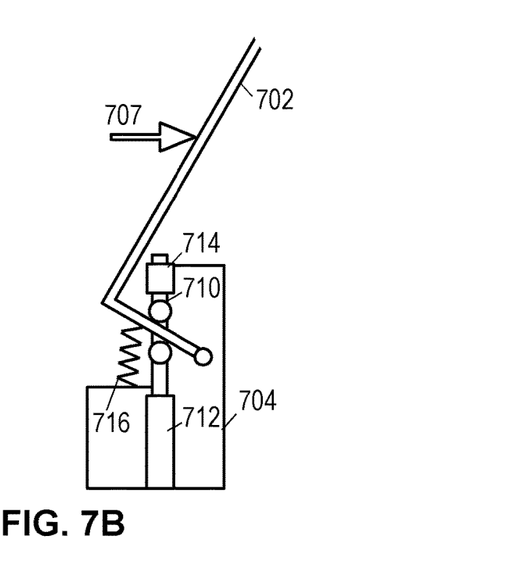

In the embodiment of FIGS. 7A-7B, drag member 702 again pivots with respect to compressor body 704, trapped between pins 708 attached to sliding rod 710 to reciprocate the rod relative to the cylinder 712 and a guide 714 that keeps the rod aligned with the cylinder 712. The rod 710 reciprocates a piston within cylinder 712 in response to motion of the drag member 702 in response to alternating drag forces 706, 707. An optional spring 716 is shown to reduce asymmetry of the alternating drag forces 706, 707.

Relative to the embodiment of FIGS. 6A-6B, the cylinder and sliding rod are re-oriented, potentially reducing the overall compressor size. Moreover, the drag member may be extended in a more axial direction rather than a radial direction, perhaps assuring greater exposure to air flow around the vehicle. Finally, the "L"-shape of drag member 702 may make a higher mechanical advantage factor feasible, enabling the use of a larger piston area.

Figure 8A:
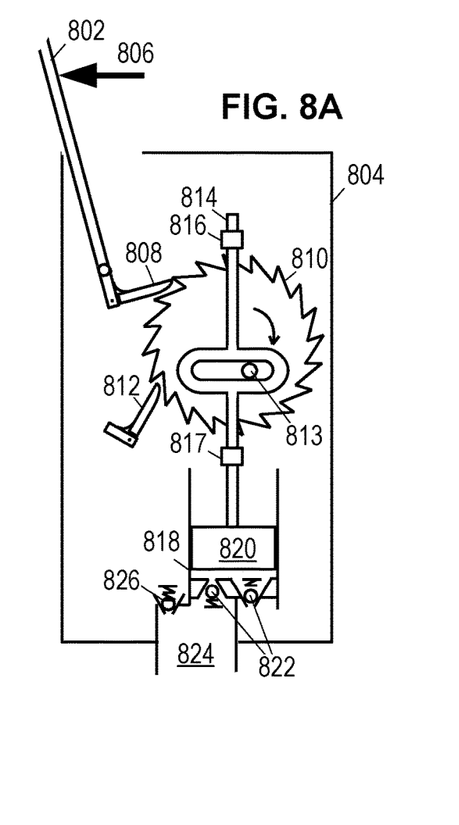
FIGS. 8A and 8B are schematic diagrams of still another illustrative drag-powered air compressor.
Figure 8B:
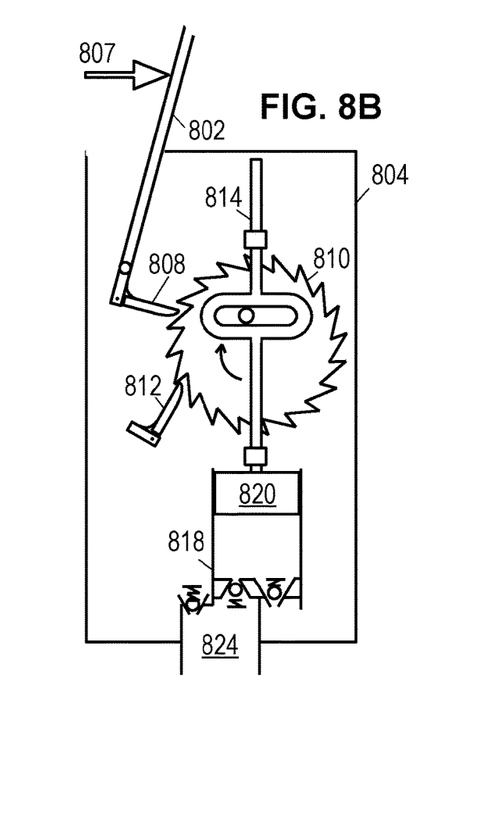

In the embodiments of FIGS. 8A-8B, drag member 802 pivots with respect to body 804, reciprocating in response to alternating drag forces 806, 807. Attached to the drag member 802, a pawl 808 engages a gear 810, advancing the gear when the drag member 802 moves left. A stationary pawl 812 engages the gear 810, holding it in place as the drag member 802 moves right. Thus reciprocating motion of drag member 802 is converted into clockwise rotation of gear 810 by operation of this ratchet mechanism. The gear includes an attached pin 813 that engages a window of slider bar 814. As the gear 810 rotates, pin 813 causes slider bar 814 to reciprocate upward & downward in guides 816, 817. A piston 820 is connected to the slider bar 814 to reciprocate within cylinder 818. A valve arrangement 822 enables the reciprocating piston 820 to draw in air, pressurize the air, and expel the compressed air to air outlet 824. A pressure limiting valve 826 may be provided to release excess pressure. Relative to the previous embodiments, the use of a ratchet mechanism enables many reciprocations of the drag member to be aggregated into a combine operation on the piston 820, enabling the use of a significantly larger piston.

Figure 9:
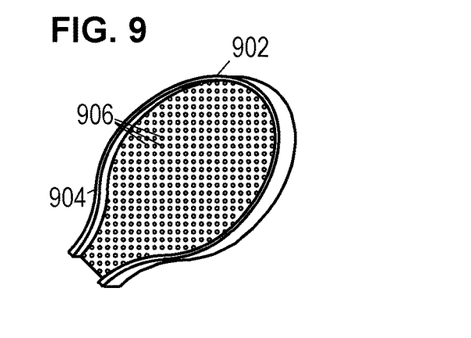
FIG. 9 is an isometric view of an illustrative drag member.

For ease of explanation, the illustrated drag members of the foregoing embodiments have been substantially flat, rectangular vanes. While such drag members are easy to manufacture and hence inexpensive, other forms may be employed for enhanced performance. FIG. 9 shows one example of an enhanced drag member 902. The shape of drag member 902 is rounded and equipped with a rim 904 make the drag member more "cup-like", thereby increasing its drag coefficient. Perforations 906 reduce the mass of the drag member while further enhancing the drag coefficient. Moreover, the shape widens near its distal end to increase the lever arm associated with the drag forces. The use of such techniques enables a larger drag force to be received for a given mass, or alternatively, enables a lighter drag member to be employed for driving the compressor.

Figure 10:
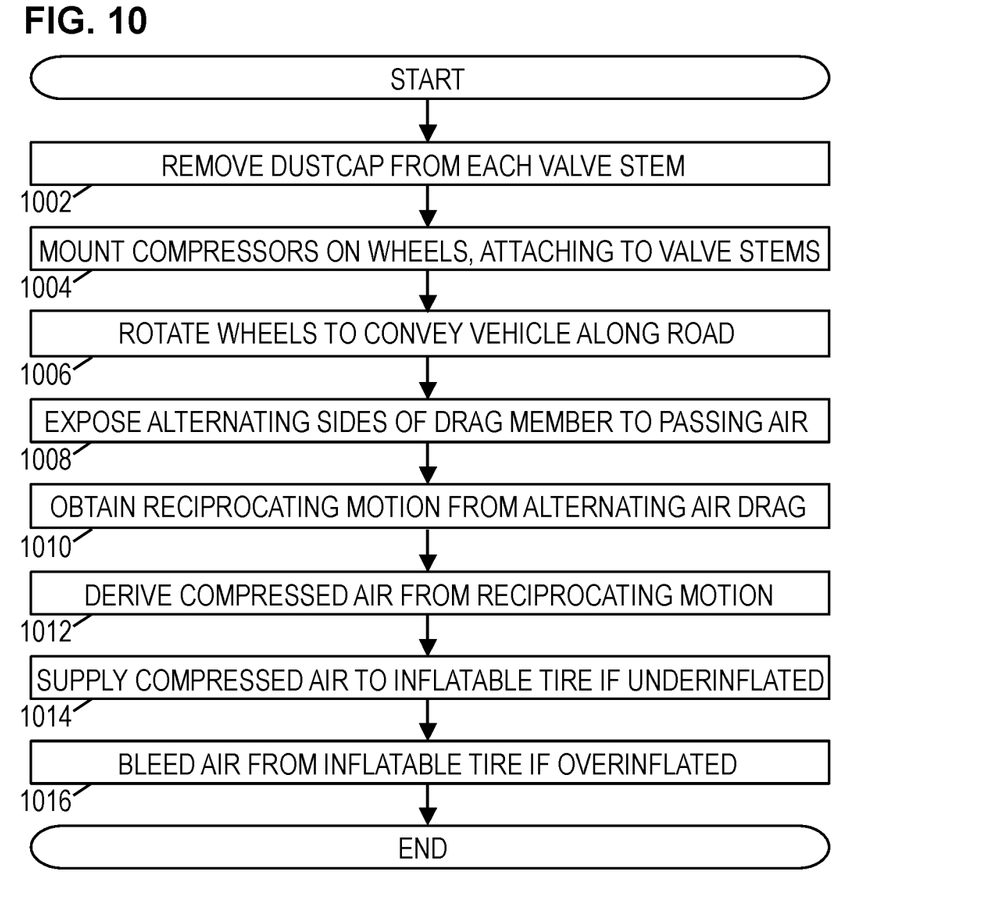
FIG. 10 is a flow diagram of an illustrative inflation-maintenance method.

In view of the foregoing disclosure, we now turn to an illustrative method for employing drag-powered air compressors for maintaining tire pressure, represented in FIG. 10 by a flow diagram. The method begins in block 1002 with the manufacturer, owner, or operator of a vehicle (hereafter "user") removing the dust caps from the valve stems on each wheel. In block 1004, the user mounts a drag-powered air compressor to each wheel, attaching the outlet of the compressors to the valve stems. In some embodiments, the air compressors are screwed or clamped directly onto the external threads of the valve stems. In other embodiments, the air compressors are mounted elsewhere (e.g., on a bracket secured by a lug nut) and connected to the valve stems via a commercially-available valve stem extender. The drag members may be aligned in a plane extending axially and radially from the center of the wheel.

In block 1006, the user operates the vehicle, e.g., employing a motor to rotate the wheels and convey the vehicle along a road. In block 1008, the compressors turn with the wheels, exposing alternating sides of their drag members to the passing air and thereby deriving an alternating drag force. In block 1010, the compressors obtain reciprocating motion of their drag members, and in block 1012, the compressors derive compressed air from the reciprocating motion.

In block 1014, the compressors supply compressed air to the tire via the valve stem if the tire is underinflated. Such underinflation may be detected if the tire pressure is below a target value (e.g., 35 psi) by more than a predetermined threshold (e.g., 3 psi). In block 1016, the compressors bleed air from the tire via the tire stem if the tire is overinflated. Overinflation may be detected if the tire pressure exceeds the target value. Alternatively to bleeding off pressure, the valve arrangement may prevent additional air from being injected into the tire, optionally trapping air in the cylinder. In at least some configurations, such trapped air inhibits reciprocation of the drag member.

Though the blocks of FIG. 10 are illustrated and described in sequence for explanatory purposes, many of the associated operations may occur concurrently and/or out of the order in which they are illustrated.

The description above has focused primarily upon the use of drag forces to power air compressors. However, it should be clear to the reader that the drag forces can also be employed for other purposes. For example, the pistons and cylinders of the FIG. 5A embodiment can be replaced by magnets and wire coils so that electric power is generated by the reciprocating motion of the drag member. Electric power could also be generated by applying the reciprocating motion to cause deformation of piezoelectric elements. The generated electric power can then be stored on in a battery or capacitor and employed for powering sensors or lights. Illustrative sensors may include sensors for tire pressure, tire mileage/wear, wheel balance, curb proximity, and other parameters. Illustrative lights may include light-emitting-diodes (LEDs), electroluminescent panels, or spark gaps, any of which may be employed for aesthetic effects. It is even possible to use the electric power to drive an electrical air compressor.

Numerous modifications, equivalents, and alternatives will become apparent to those skilled in the art once the above disclosure is fully appreciated. It is intended that the following claims be interpreted to embrace all such modifications, equivalents, and alternatives where applicable.

What is claimed is:

1. An air compressor that comprises:
    a compressor body that attaches to a wheel of a vehicle to turn with the wheel as the vehicle moves; and
    a drag member that extends from the wheel to alternately present opposing surfaces to air through which the vehicle moves, thereby receiving an alternating drag force that powers the air compressor.

2. The air compressor of claim 1, further comprising an air outlet that couples to an inlet valve of an inflatable tire mounted to the wheel.

3. The air compressor of claim 2, wherein the inlet valve is a Schrader valve, and wherein the air outlet includes a prong to keep the Schrader valve open.

4. The air compressor of claim 3, further comprising a pressure limiting valve to prevent overfilling of the inflatable tire.

5. The air compressor of claim 2, wherein the compressor body attaches to the wheel solely via the coupling between the air outlet and the inlet valve.

6. The air compressor of claim 2, further comprising a valve stem extender that couples the air outlet to the inlet valve.

7. The air compressor of claim 6, further comprising a bracket that secures the compressor body to a wheel lug.

8. The air compressor of claim 2, further comprising a diaphragm or bellows driven by reciprocating motion of the drag member to compress and expel air via the air outlet.

9. The air compressor of claim 1, further comprising:
    a piston driven by reciprocating motion of the drag member; and
    valves that cause the piston to draw air into a cylinder and expel compressed air from the cylinder.

10. The air compressor of claim 9, wherein the air compressor further comprises a ratchet mechanism to aggregate reciprocations of the drag member into a combined operation on the piston.

11. The air compressor of claim 1, wherein the alternating drag force is asymmetric, and wherein the air compressor further comprises a spring to reduce the asymmetry.

12. The air compressor of claim 1, wherein the drag member comprises a vane that extends no more than 2.5 cm from the compressor body.

13. A vehicle that comprises:
    one or more wheels, each wheel having:
        an inflatable tire with a valve stem; and
        an air drag powered air compressor attached to the valve stem, the compressor rotating with the wheel and operated by motion of the vehicle through air to maintain inflation of the tire at a target level.

14. The vehicle of claim 13, wherein each compressor comprises a drag member that presents alternating surfaces to the air as the wheel rotates to derive a reciprocating motion from air drag, and wherein the reciprocating motion drives a positive displacement or rotary compression mechanism to provide compressed air.

15. The vehicle of claim 14, wherein each compressor further includes a valve arrangement that supplies the compressed air to the tire when the tire has an inflation level below the target level by more than a given threshold, and that bleeds air from the tire when the tire has an inflation level above the target level.

16. The vehicle of claim 14, wherein the positive displacement mechanism is a piston that is directly actuated by reciprocation of the drag member.

17. A method of maintaining a targeted inflation level in vehicle tires, the method comprising:
    causing wheels supporting a vehicle to rotate, thereby conveying the vehicle along a road; and
    on each wheel:
        exposing alternating sides of a drag member on the wheel to air through which the vehicle moves, thereby receiving an alternating drag force that reciprocates the drag member relative to the wheel;
        deriving compressed air from reciprocation of the drag member; and
        supplying the compressed air to an inflatable tire on the wheel when an inflation level of the tire falls below the target inflation level by more than a threshold value.

18. The method of claim 17, further comprising, on each wheel:
    bleeding air from the tire when an inflation level exceeds the target inflation level.

19. The method of claim 17, further comprising:
    removing a dust cap from a valve stem on each wheel; and
    securing an air drag powered air compressor to the valve stem in place of each dust cap.

* * * * *